(12) United States Patent
Sczaniecki

(10) Patent No.: US 7,672,801 B1
(45) Date of Patent: Mar. 2, 2010

(54) GRIDLOCK PROCESSING METHOD

(75) Inventor: Leszek J. Sczaniecki, Morrestown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 130 days.

(21) Appl. No.: 11/952,268

(22) Filed: Dec. 7, 2007

(51) Int. Cl.
*G06F 19/00* (2006.01)
*G06F 15/00* (2006.01)

(52) U.S. Cl. .................................. 702/95; 702/150

(58) Field of Classification Search .............. 702/95, 702/150, 153; 356/601
See application file for complete search history.

(56) References Cited

U.S. PATENT DOCUMENTS

| 2003/0160970 A1* | 8/2003 | Basu et al. ............... 356/601 |
| 2003/0169945 A1 | 9/2003 | Stanek |

OTHER PUBLICATIONS

Li Da and Li Shaohong, "Real-Time Sequential Kalman Filter Sensor Registration Algorithm", 0-7803-9582-4/06 2006 IEEE.
He, et al, "Research on the Real-Time Registration Technique for Radar Networking", 2005 IEEE International Symposium on Microwave, Antenna, Propagation and EMC Technologies for Wireless Communication Proceedings, 0-7803-9128-4/05 2005 IEEE.
I.T. Li, J. Georganas, "Multi-target Multi-platform Sensor Registration in Geodetic Coordinates", ISF 2002.
Abbas, et al, "Track-Independent Estimation Schemes for Registration in a Network of Sensors", Proceedings of the 35th Conference on Decision and Control, Kobe, Japan, Dec. 1996, 0-7803-3590-2/96 IEEE.
Kosuge, et al, "Statistical Analysis for Bias Estimation of Two 3-Dimensional Radars-A Prerequisite for Multiple Radar Multi-target Tracking", PR0001-3/98/0000-0945, 1998 SICE.
Kosuge, et al, "Bias Estimation of Two 3-Dimensional Radars Using Kalman Filter", 0-7803-3219-9/96, 1996 IEEE.
Zhou, et al, "An Exact Maximum Likelihood Registration Algorithm for Data Fusion", IEEE Transactions on Signal Processing, vol. 45, No. 6, Jun. 1997.

* cited by examiner

*Primary Examiner*—Bryan Bui
(74) *Attorney, Agent, or Firm*—Duane Morris LLP

(57) ABSTRACT

Targets are sensed by a first sensor in a first coordinate system and by a second sensor in a second coordinate system. Gridlock or congruence between the coordinate systems is achieved by sensing at least four targets with both sensors. Pseudomeasurements are generated in both local and external coordinate systems by taking the differences between a first target location and each of second, third, and fourth target locations. The pseudomeasurements are filtered in corresponding pairs, to thereby generate an estimated rotation matrix between the local and external coordinate systems. The estimated rotation matrix is applied to the local coordinate system. The target locations in the rotated local and external coordinate systems are filtered in corresponding pairs to generate an estimated translation vector. The rotation and translation are applied to the local coordinate system to bring it into congruence with the external coordinate system.

5 Claims, 9 Drawing Sheets

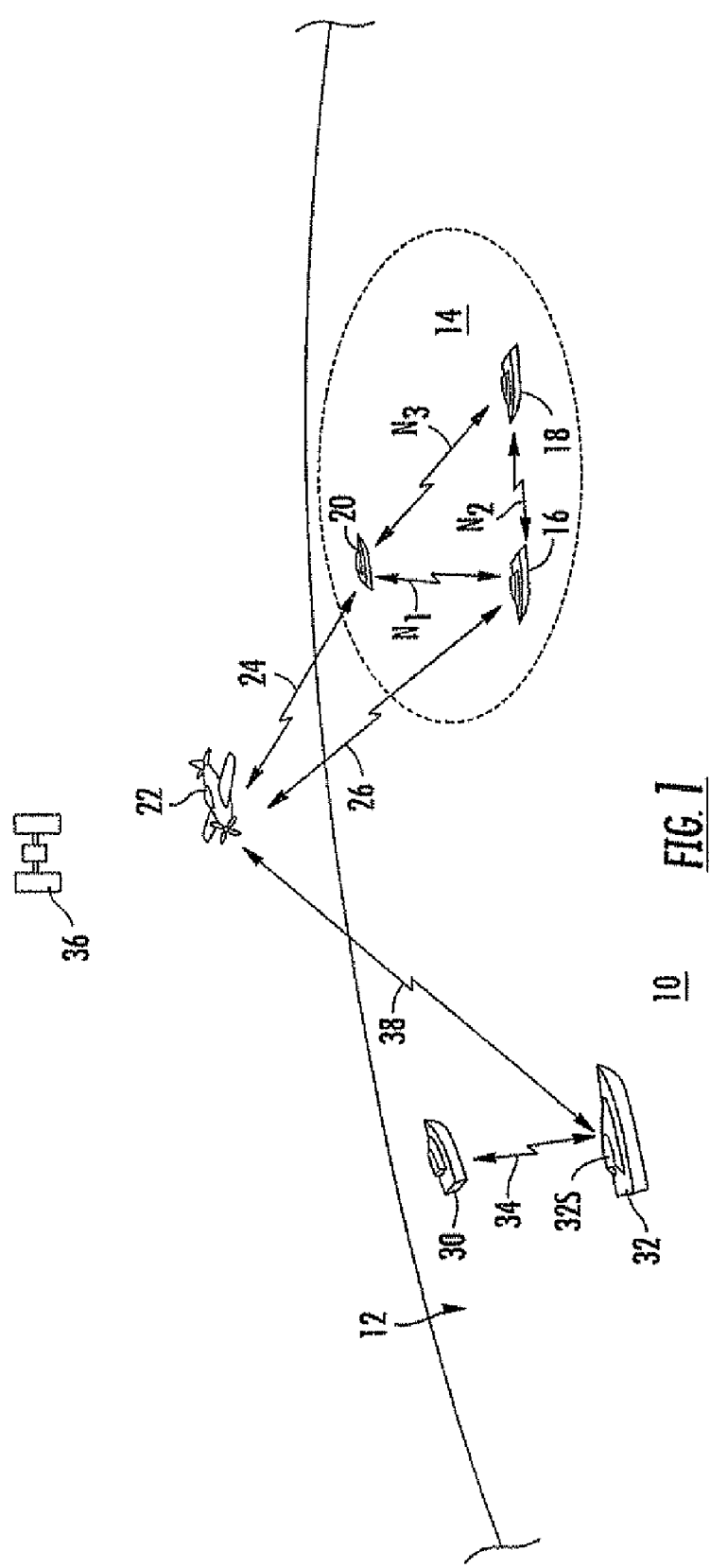

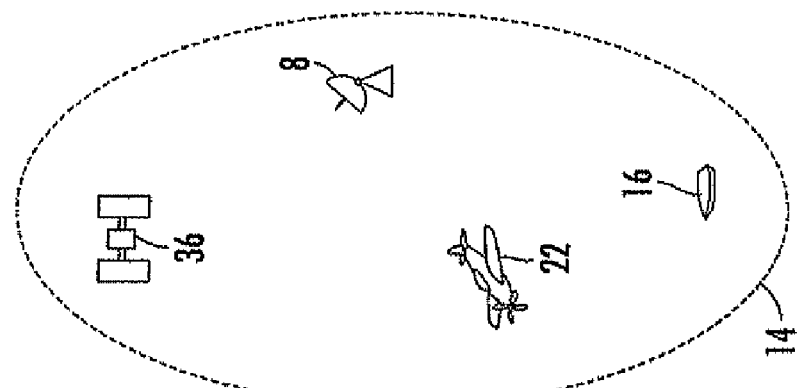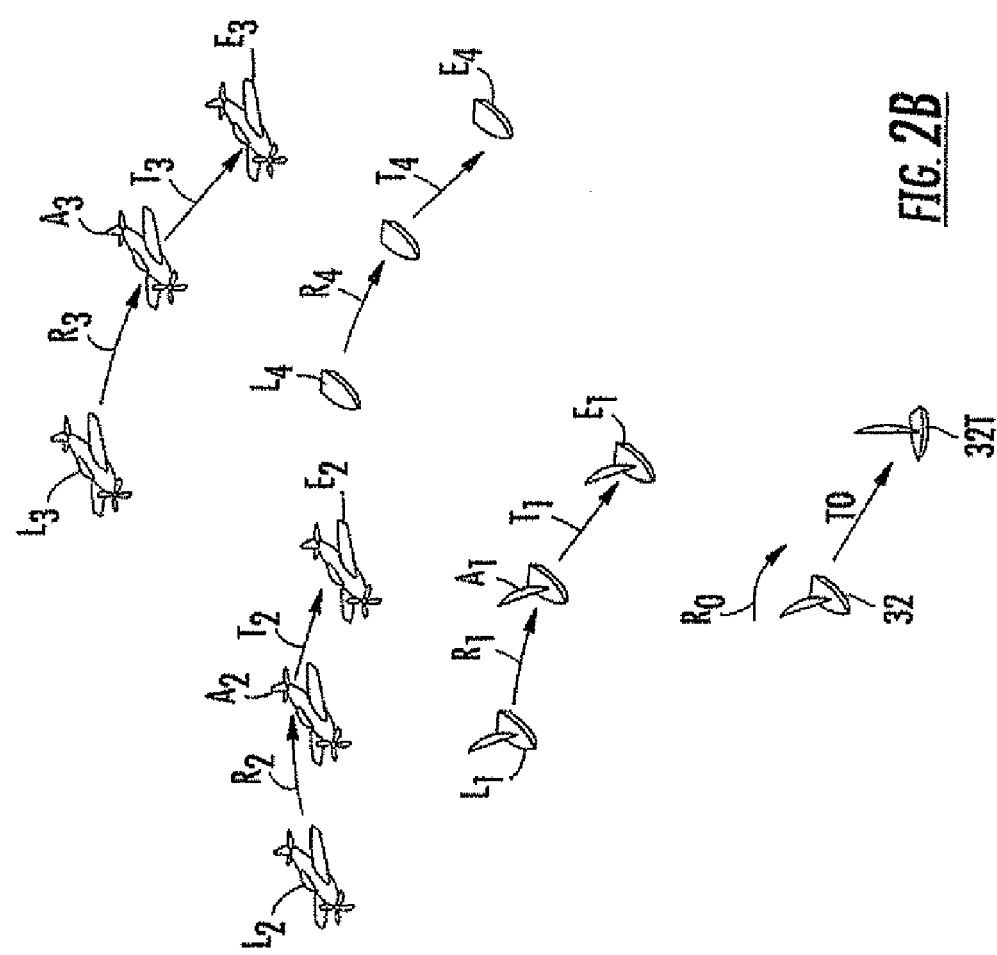
FIG. 2B

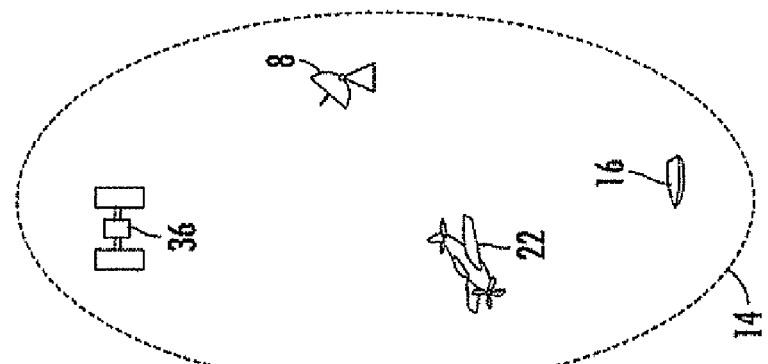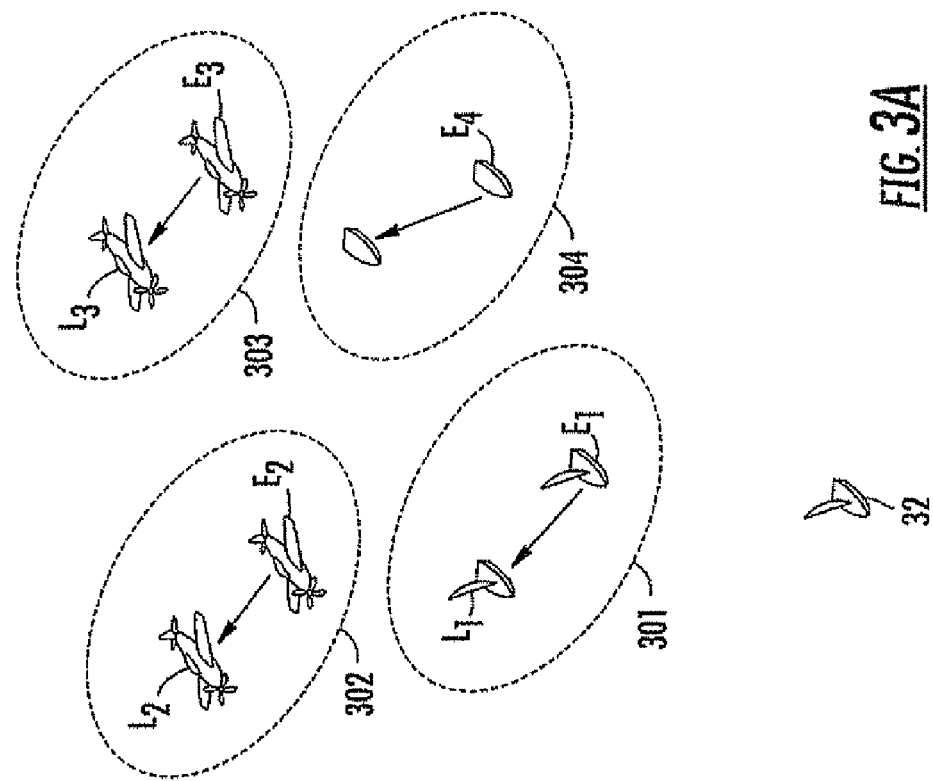
FIG. 3A

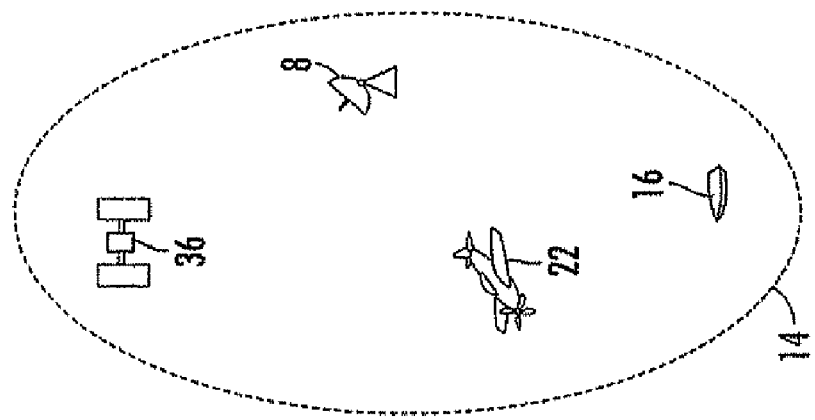
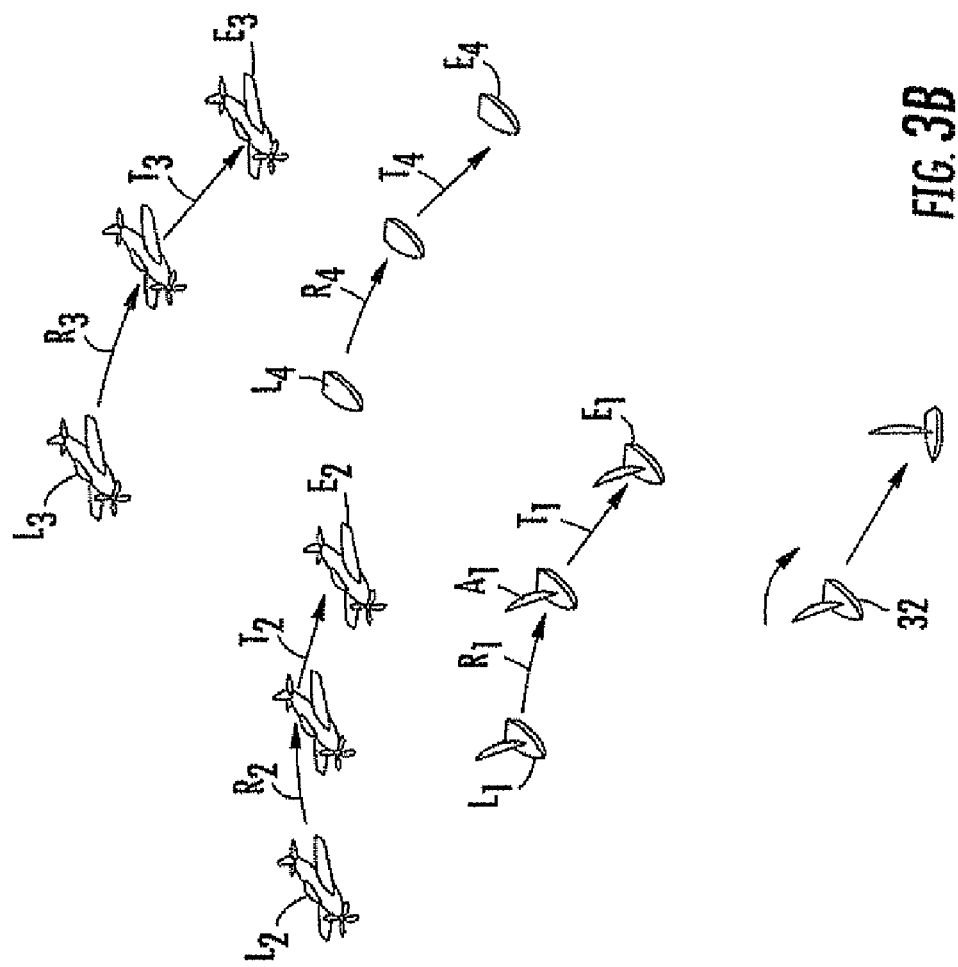
FIG. 3B

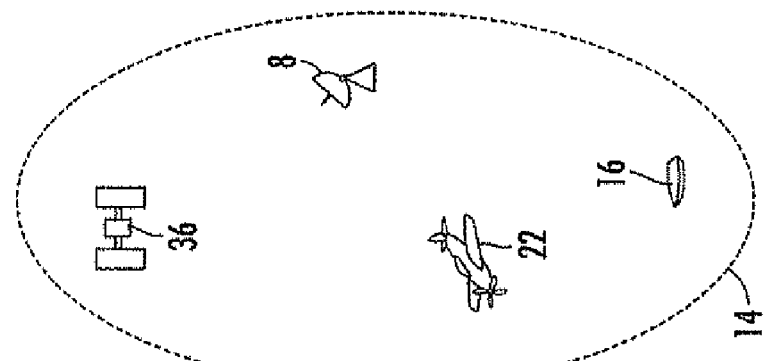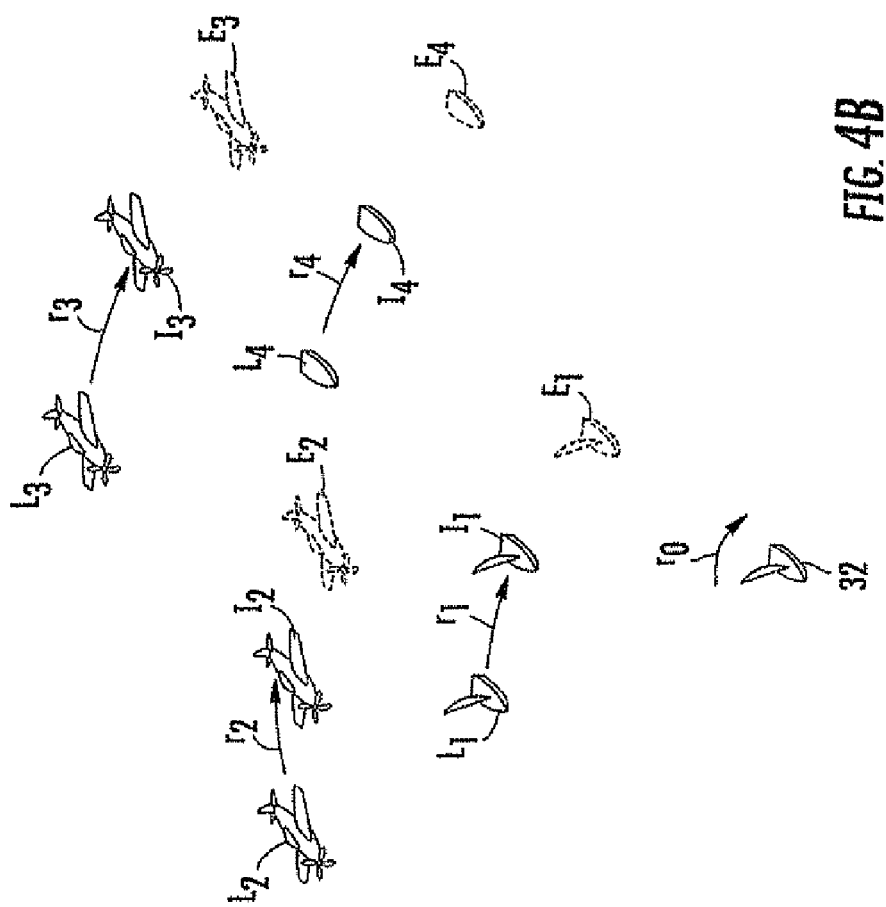
FIG. 4B

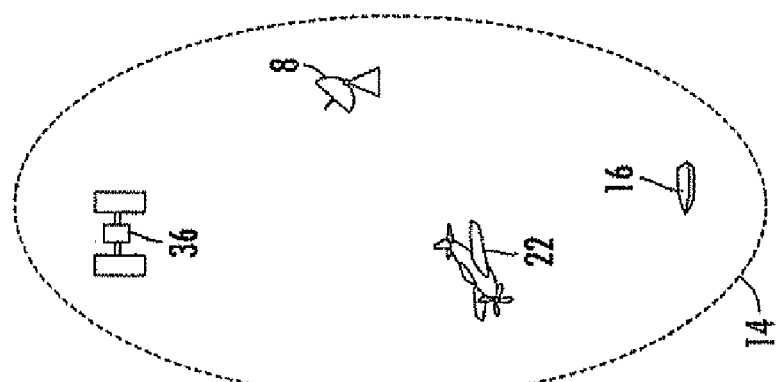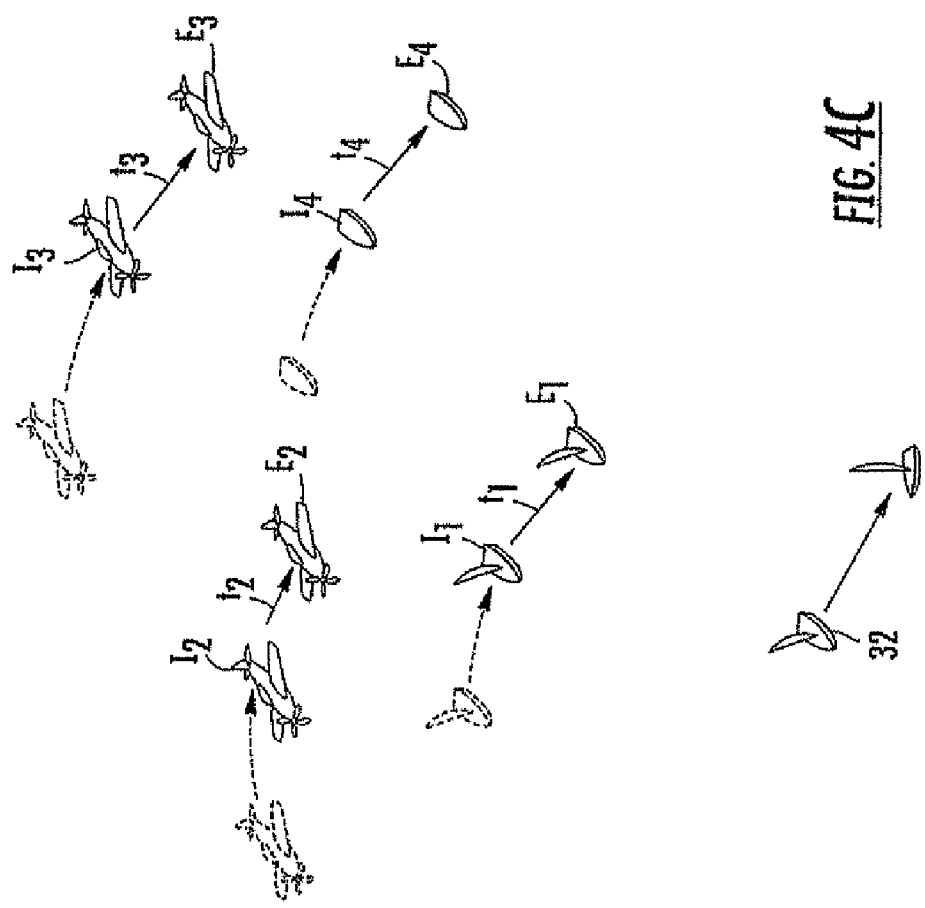
FIG. 4C

GRIDLOCK PROCESSING METHOD

BACKGROUND OF THE INVENTION

Military techniques often include the deployment of a plurality of platforms or vehicles, such as armored vehicles in a terrestrial context, aircraft in an aerial environment, and ships in a naval context. Many, if not most, of these vehicles are equipped with one or more sensors for sensing the environment of the vehicle and for producing signals indicative of the presence of potential targets. As to any particular vehicle, its sensors may respond to other friendly vehicles and also to potentially unfriendly vehicles and other targets. It should be noted that in some contexts an individual may carry sensors and for this purpose may be considered to be a platform or vehicle.

The sensors of a group of vehicles (or vehicles and individuals) dispersed over a combat region will often gather more total information than any single vehicle alone, as the locations and capabilities of some of the sensors allows the sensed area to extend beyond the sensing range of many of the other sensors. For purposes of providing maximum information to each vehicle (and individual, if applicable), it is desirable to interconnect the vehicles so that the combined data from the group of sensors is available to each member of the group. Thus, the information from a sensor on a particular platform may be transmitted by way of an information path to another platform. This information may be about the location(s) of friendly vehicles or potentially unfriendly entities.

When information about entities in the environment (hereinafter targets) is received over a communication channel from a sensor on another vehicle, the information must be correlated with the information sensed by the own-vehicle sensors. If correlation is not performed, the possibility exists that each of several remote sensors will sense the same target, but, due to unavoidable inaccuracies among the coordinate systems of the various sensors or vehicles, at disparate locations. It is easy to understand that this can be very disadvantageous, as a single hostile target sensed by many friendly forces might be incorrectly interpreted as being a swarm of hostiles, each at a slightly different location. This, in turn, might lead to the unnecessary launching of a large number of countermeasure missiles, when there is but a single target. In addition, since the target's actual location appears differently at each of the friendly vehicles, there is the potential for missing the target with many of the countermeasures.

A conventional way to correlate the coordinate systems is to correlate the own-vehicle sensor targets with the ones identified by other vehicles. This can often be done seriatim, in that vehicles arrive at a particular gathering point sequentially, and the second to arrive can correlate its coordinate system to that of the first-to-arrive by gridlock techniques. Gridlock techniques involve the assumption that targets in an area should appear in the sensor data of both sources. Mathematical transformations can be performed at one of the platforms to minimize the errors between the remotely reported locations of the targets and the locally reported locations of the targets.

FIG. 1 is a plan view of a portion 10 of a sea surface 12 in which several platforms in the form of ships are disposed. In FIG. 1, a flotilla 14 of friendly platforms includes ships 16, 18, and 20. Ships 16, 18, and 20 each bear sensors, such as radar, infrared sensors, optical sensors, or the like, which sense the presence of the other ships of flotilla 14, and which also sense the presence of aircraft in the vicinity, represented by an aircraft 22. The sensing of aircraft such as 22 by the platforms of flotilla 14 is represented in FIG. 1 by "lightning bolt" symbols 24 and 26. The ships 16, 18, and 20 of flotilla 14 communicate among themselves by means of a communication network N, inter-ship portions of which are designated by lightning bolt symbols $N_1$, $N_2$, and $N_3$. It should be understood that the intership network N may include many different signal paths, which variously include digital and analog portions, portions which are encrypted and other portions of which are not encrypted, and which traverse various paths, possibly including a path extending through a satellite 36. It also should be understood that, while ships are principally illustrated as being nodes of the network, the network can include air, space, and land assets.

Each of the sensors of ships 16, 18, and 20 of flotilla 14 of FIG. 1 makes its own assessment of the sensor signals which its own sensors generate, and distribute the assessed information (or possibly some raw information from some sensors) over the network N among the ships of the flotilla. Thus, each ship of flotilla 14 has access to all the information from the various ships of the flotilla.

From the location of flotilla 14 of FIG. 1, a hostile ship 30 is over the horizon, and therefore may be invisible to the sensors of the flotilla 14. A friendly ship 32 is illustrated as being in the general vicinity of hostile ship 30, sufficiently so that its sensors can sense the hostile ship, as suggested by lightning bolt 34. Friendly ship 32 also senses aircraft 22 as represented by lightning bolt 38.

When friendly ship 32 "joins" the flotilla 14, as by joining network N, it is desirable that the information sensed by friendly ship 32 be made available over network N to the various ships 16, 18, and 20 of flotilla 14, and that the information sensed the ships of the flotilla be made available to friendly ship 32. When ship 32 joins the flotilla 14, additional "target" information is made available over the network to the various ships. It is desirable to quickly and accurately rationalize the coordinate systems of the flotilla and of friendly ship 32, so that the information which is "new" to each platform can be effectively used, as by orchestrating a response to the presence of hostile ship 30.

SUMMARY OF THE INVENTION

A method according to an aspect of the invention is for determining the orientation and location of a platform for purposes of gridlock and or registration. The platform carries at least a local sensor which tracks remote objects. The method comprises the step of generating from the local sensor first, second, third, and fourth local sensor signals representing at least first, second, third and fourth noncoplanar remote object positions, respectively. The method further includes the step of acquiring first, second, third, and fourth remote external signals representing the positions of the first, second, third, and fourth objects. Computations are performed by taking the difference between the first local sensor signal and the second local sensor signal, the third local sensor signal, and the fourth local sensor signal, to thereby generate a set of first, second, and third translationally invariant local pseudomeasurements. The difference is taken between the first remote external signal and the second remote external signal, the third remote external signal, and the fourth remote external signal, to thereby generate a set of first, second, and third translationally invariant remote pseudomeasurements. The first, second, and third local and remote pseudomeasurements are iteratively filtered to thereby generate an estimated rotation which results in the best agreement between the local and remote pseudomeasurements. This estimated rotation is used to at least partially correct the coordinate system associated with the local sensor, to thereby improve the registration between or among the first, second, third, and fourth local and remote sensor signals.

According to another mode of the method of the invention, a further step is performed of applying the estimated rotation to the first, second, third, and fourth local sensor signals, to thereby generate first, second, third, and fourth rotationally adjusted local object positions. The first, second, and third local rotationally adjusted and remote measurements are iteratively filtered to thereby generate an estimated translation which results in the best agreement or registration between the local and remote measurements. In a preferred version of this mode of the method, the further step is performed of applying the estimated rotation and translation to the location and orientation of the platform.

A method according to another aspect of the invention is for determining the location of at least four separate target objects. The method includes the step of sensing the target objects from a local location, to thereby generate local target signals identifying the locations of the target objects in a local coordinate system. The method also includes the step of sensing the target objects from a remote location relative to the local location, to thereby generate external target signals identifying the locations of the objects in an external coordinate system, which locations in the external coordinate system will in general not coincide with the locations of the target objects in the local coordinate system. The difference is taken between the locations of three of the target objects in the local coordinate system and a fourth of the target objects in the local coordinate system to thereby generate translationally invariant pseudomeasurements in the local coordinate system. The difference is taken between the locations of three of the target objects in the external coordinate system and a fourth of the target objects in the external coordinate system to thereby generate translationally invariant pseudomeasurements in the external coordinate system. Each of the pseudomeasurements in the external coordinate system corresponds to one of the pseudomeasurements in the local coordinate system. Corresponding pairs of the local and external pseudomeasurements are iteratively filtered, as by a Kalman filter, to thereby produce an estimated rotation which provides the best agreement between the local and remote coordinate systems. The estimated rotation is applied to the locations of the targets in the local coordinate system, to thereby generate rotated target locations or positions in the local coordinate system. Each of the rotated target positions in the local coordinate system corresponds to one of the target positions in the external coordinate system. Corresponding pairs of the rotated target positions and the target positions in the external coordinate system are iteratively filtered to thereby produce an estimated translation which provides the best agreement between the local and remote coordinate systems. The estimated rotation and the estimated translation are applied to the locations of the target objects in a local coordinate system, to thereby match the locations as sensed in the local coordinate system with the locations as sensed in the external coordinate system. The local target signals, identifying the locations of the target objects in the local coordinate system to which the estimated rotation and the estimated translation have been applied, which is to say in the external coordinate system, are displayed or otherwise used.

A method for determining the location of at least first, second, third, and fourth separate and noncoplanar target objects includes the step of sensing the target objects from a local location, to thereby generate first, second, third, and fourth local target signals identifying the locations of the target objects in a local coordinate system. The method also includes the step of sensing the target objects from a remote location relative to the local location, to thereby generate first, second, third, and fourth external target signals identifying the locations of the objects in an external coordinate system. The locations of the target objects in the external coordinate system will in general not coincide with the locations of the target objects in the local coordinate system. The method further includes the step of taking the difference between the locations of the first and second, the first and third, and the first and fourth target objects in the local coordinate system to thereby generate first, second, and third translationally invariant pseudomeasurements in the local coordinate system. The difference is taken between the locations of the first and second, the first and third, and the first and fourth target objects in the external coordinate system to thereby generate first, second, and third translationally invariant pseudomeasurements in the external coordinate system, each of which pseudomeasurements in the external coordinate system corresponds to a pseudomeasurement in the local coordinate system. The first, second, and third local and external pseudomeasurements are iteratively filtered to thereby produce an estimated rotation, in the form of a matrix, which provides the best agreement between the local and remote coordinate systems. The estimated rotation is applied to the first, second, third, and fourth local target signals in the local coordinate system, to thereby generate rotated target locations in the local coordinate system, which first, second, third, and fourth rotated target positions in the local coordinate system correspond to the first, second, third, and fourth target positions in the external coordinate system, respectively. The method includes the steps of iteratively filtering the first rotated target position in the local coordinate system with the first target position in the external coordinate system, the second rotated target position in the local coordinate system with the second target position in the external coordinate system, the third rotated target position in the local coordinate system with the third target position in the external coordinate system, and the fourth rotated target position in the local coordinate system with the fourth target position in the external coordinate system, to thereby produce an estimated translation which provides the best agreement between the local and remote coordinate systems. The estimated rotation and the estimated translation are applied to the first, second, third and fourth locations of the target objects in the local coordinate system, to thereby match the locations as sensed in the local coordinate system with the locations as sensed in the external coordinate system. The local target signals, identifying the locations of the target objects in the local coordinate system to which the estimated rotation and the estimated translation have been applied, are displayed or otherwise used.

BRIEF DESCRIPTION OF THE DRAWING

FIG. 1 is a simplified view of a portion of the earth on which a flotilla and other platforms or ships navigate;

FIG. 2B illustrates the problem with determining translations and rotations in the arrangement of FIG. 2A;

FIG. 3A illustrates data for an example of a prior-art method for gridlocking, and FIG. 3b illustrates the ONE-STEP prior art method for determining the translations and rotations required on the data of FIG. 3A to achieve coincidence;

FIG. 4B illustrates determination of rotations required for gridlock following the pseudomeasurement step, and FIG. 4C illustrates the determination of the translations associated with the rotations.

DESCRIPTION OF THE INVENTION

Figure 2A:
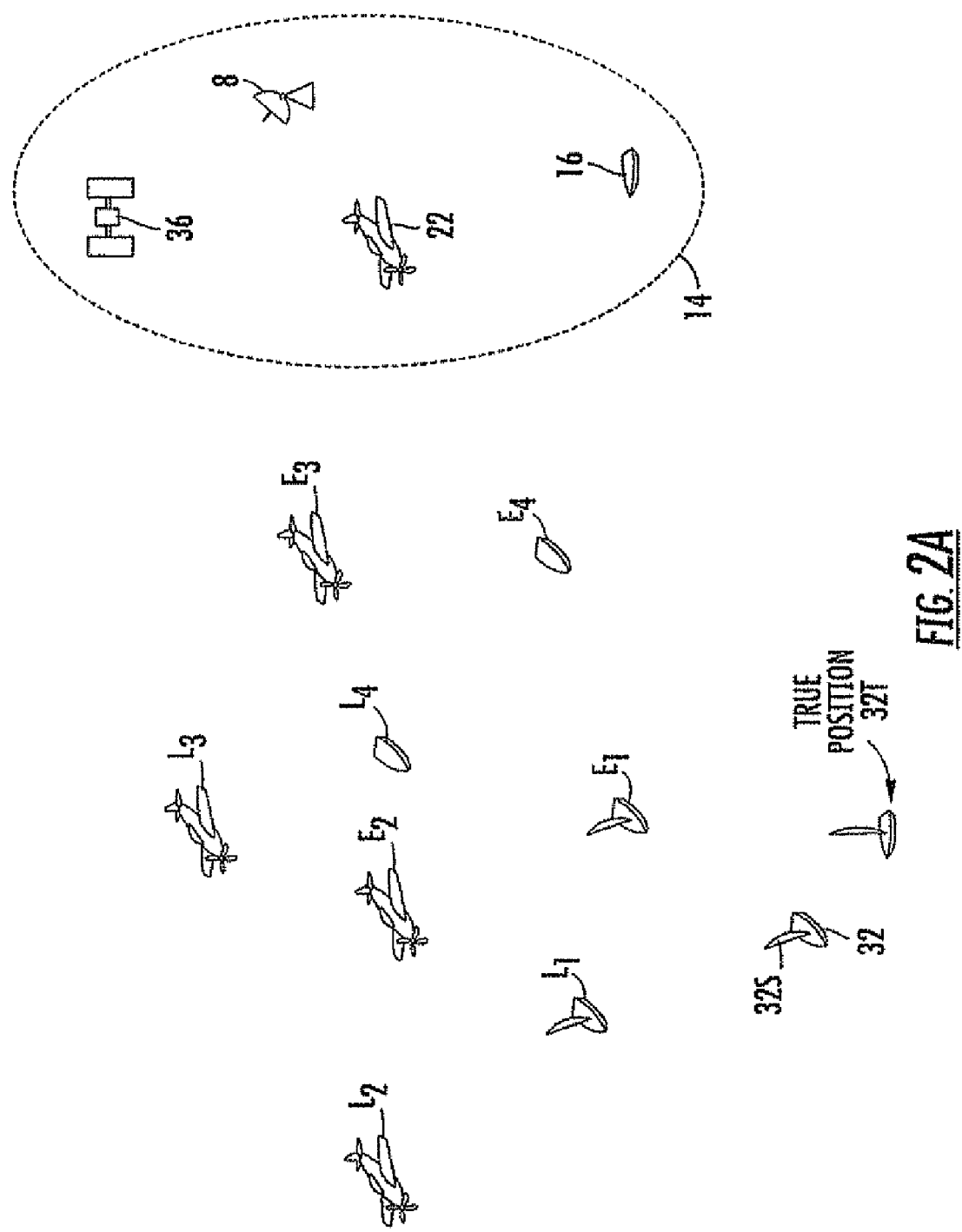
FIG. 2A is a simplified representation of target locations as viewed by local and remote sensors on various ships or platforms such as those illustrated in FIG. 1.

FIG. 2A is a representation of the targets perceived by local and remote sensors. More particularly, ship 32 of FIG. 2A senses targets using its own sensor(s) 32S. The true position of ship 32 in the coordinate system of flotilla 14 is indicated by 32T. As illustrated in FIG. 2A, four targets are sensed or detected by "ownship" or "local" sensor 32S. The first target is a surface vehicle or ship locally sensed at a location designated L1. The second target is an aircraft locally sensed at location L2. The third target is a second aircraft locally sensed at location L3. The fourth target is another surface vehicle locally sensed at location L4.

As mentioned, the various targets are sensed by sensors which are associated with other platforms than ownship 32. More particularly, land-based platform 8, ship 16, aircraft 22, and spacecraft 36 of FIG. 2A are fitted with their own sensors, which also detect the four targets. Any one of the sensors associated with the remote platforms 8, 16, 22, and or 36 will sense the targets at different locations than those sensed by ownship 32 sensor 32S. In general, the flotilla 14 will have already established gridlock among its elements, so that there is a common coordinate system. Taking the sensors of remote ship 16 as representative of any one of the remote sensors or of the gridlocked remote sensors, the four targets are sensed by "external" (to ownship 32) sensors at locations designated E1, E2, E3, and E4, different from locations L1, L2, L3, and L4, respectively, due in part to unavoidable noise and errors, and also due in part to noncoincidence of the coordinate systems in which the sensing is performed.

It will be clear that in a context such as that of FIG. 1, where many remote platforms survey a large area, that each of the remote platforms will sense the various targets, and each of the targets so sensed will, in general, be at a different location. The information from the various sensors is made available to each of the platforms. Thus, the four target locations sensed by remote ship 16 are made available to ship 32 and to other ships and platforms of flotilla 14, and also to aircraft 22. Similarly, target locations sensed by spacecraft 36 are reported to the ships of flotilla 14, to ship 32, and to aircraft 22.

While each platform of FIG. 2A potentially receives target location information from many sources, the principles of the invention may be understood by considering only locally determined locations L1, L2, L3, and L4 in conjunction with the remotely determined locations E1, E2, E3, and E4. The remotely determined locations E1, E2, E3, and E4 are transmitted over a network path from the remote platforms to ownship 32. The locally (ownship) determined locations L1, L2, L3, and L4 must be registered with remotely determined locations E1, E2, E3, and E4, respectively.

More generally, the targets of FIG. 2A may be designated by numbers 1, 2, 3, ..., N. The locally generated estimated positions (in the local coordinate system) are $$\vec{q}_{1,L}, \vec{q}_{2,L}, \vec{q}_{3,L}, \vec{q}_{4,L}, \ldots$$

and the remotely generated estimated positions (in any one of the various remote coordinate systems are $$\vec{q}_{1,E}, \vec{q}_{2,E}, \vec{q}_{3,E}, \vec{q}_{4,E}, \ldots$$

where subscript letters L and E refer to local and external (or remote), respectively.

FIG. 2B is similar to FIG. 2A, and represents the problem presented in effecting registration of the coordinate systems. In general, registration can be accomplished by a combination of coordinate system rotations and translations. Thus, in order to "superpose" locally sensed ship L1 onto the same ship remotely sensed as E1, it is possible to rotate (about the ownship location) the sensed target L1 by an amount R1 to effect a shift to position A1, followed by a translation T1 to the externally sensed location E1. Similarly, the locally sensed position L2 can be rotated by R2 to position A2, followed by a translation from position A2 to externally sensed position E2, the locally sensed position L3 can be rotated by R3 to position A3, followed by a translation from position A3 to externally sensed position E3, and the locally sensed position L4 can be rotated by R4 to position A4, followed by a translation from position A4 to externally sensed position E4. The rotation of the ownship coordinate system is represented in FIG. 2B by rotation R0, and the translation of ownship position is represented by translation T0. It can be shown that there are many possible combinations of rotation and translation which result in the same transformation of target locations. Therefore, a problem with performing the rotations and translations in the presence of many targets is that there are multiple possible rotations and translations which can result in superposition of the various locally and remotely sensed targets, and a solution is not exclusive. This is often referred to as "cross-coupling" between rotation and translation. Consequently, there may be inaccuracies or inconsistencies among the superpositions, depending upon the particular rotations and translations used for each transformation. Consequently, the prior art transformations are indefinite.

FIG. 3A illustrates the data which may be used to describe a prior-art method or arrangement for obtaining gridlock or superposition of the various locally and remotely sensed targets. In FIG. 3A, the targets L1,E1 are indicated as being grouped into a group 301, targets L2,E2 are indicated as being grouped into a group 302, targets L3,E3 are indicated as being grouped into a group 303, and targets L4,E4 are indicated as being grouped into a group 304. FIG. 3E is similar to FIG. 2b, and represents a one-step solution to determine both rotation and translation, as described (but not in haec verba), for example, in various prior art publications, including Real-Time Sequential Kalman Filter Sensor Registration Algorithm, Li Da and Li Shaohong, 0-7803-9582-4/06 2006 IEEE; Research on Real-time Registration Technique for Radar Networking, H E You et al, 2005 IEEE International Symposium on Microwave, Antenna, Propagation and EMC Technologies for Wireless Communication Proceedings; Multi-target Multi-platform Sensor Registration in Geodetic Coordinates, I. T. Li & John Georganas, ISF 2002; TRACK-INDEPENDENT ESTIMATION SCHEMES FOR REGISTRATION IN A NETWORK OF SENSORS, H. Abbas et al, Proceedings of the 38$^{th}$ Conference on Decision and Control, Kobe, Japan December 1996, 0-7803-3590-2/96 IEEE; Statistical Analysis for Bias Estimation of Two 3-Dimensional Radars—A Prerequisite for Multiple Radar Multi-target Tracking—, Kosuge et al., PR0001-3/98/0000-0945 ©1998 SICE; Bias Estimation of Two 3-Dimensional Radars Using a Kalman Filter, Kosuge et al., 0-7803-3219-9/96 ©1996 IEEE; An Exact Maximum Likelihood Registration Algorithm for Data Fusion, Zhou et al., IEEE Transactions on Signal Processing, Vol 45, No. 6, June 1997; and US Patent Publication 2003/0169945, published Sep. 11, 2003 in the name of Stanek.

Each group 301, 302, 303, 304 (each pair of target locations in the local coordinate system and in the external coordinate system) as illustrated in FIG. 3A) is processed by taking the differences between the reported locations of each pair, and sequentially filtering, as by a Kalman filter, to obtain estimates for the translation and rotation of the local coordinate system (or of the external coordinate system) required for registration/gridlock or congruence/superposition. In FIG. 3B, rotation R1 applied to ownship-measured local target position L1 moves the apparent location target location to an intermediate position A1, which is closer to externally determined location E1. Rotation R2 applied to ownship-measured local target position L2 moves the apparent location A2 closer to externally determined location E2. Rotation R3 applied to ownship-measured local target position L3 moves the apparent location to A3, which is closer to externally determined location E3. Rotation R4 applied to ownship-measured local target position L4 moves the apparent location to A4, closer to externally determined location E. The amounts of rotation R1, R2, R3, and R4 required for each target will in general not be the same.

Thus, FIG. 3B is similar to FIG. 2B, and represents a prior-art scheme for effecting registration by use of translation and rotation of coordinates. In FIG. 3B, the translations required for each locally sensed target to bring it into congruence or superposition with the remotely sensed targets may be of different magnitudes and directions. FIG. 3B illustrates the prior art transformation of target locations by means of a combination of rotations and translations. In FIG. 3B, rotation R1 in conjunction with translation T1 can transform location L1 to location E1. Similarly, rotation R2 in conjunction with translation T2 can transform location L2 to location E2, rotation R3 in conjunction with translation T3 can transform location L3 to location E3, and rotation R4 in conjunction with translation T4 can transform location L4 to location E4.

Figure 4A:
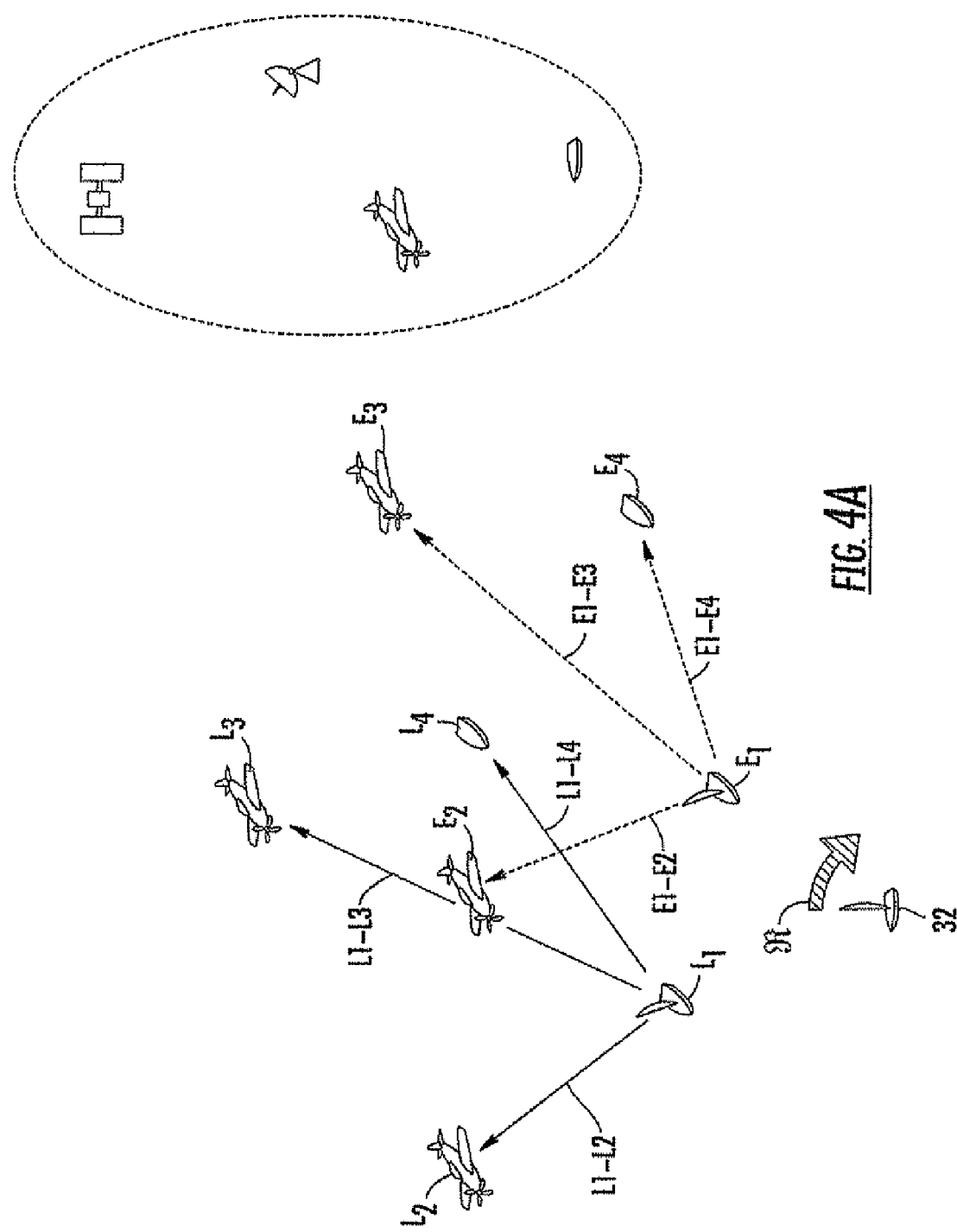
FIG. 4A illustrates a first step in the multistep according to an aspect of the invention, involving pseudomeasurements.
Figure 5:
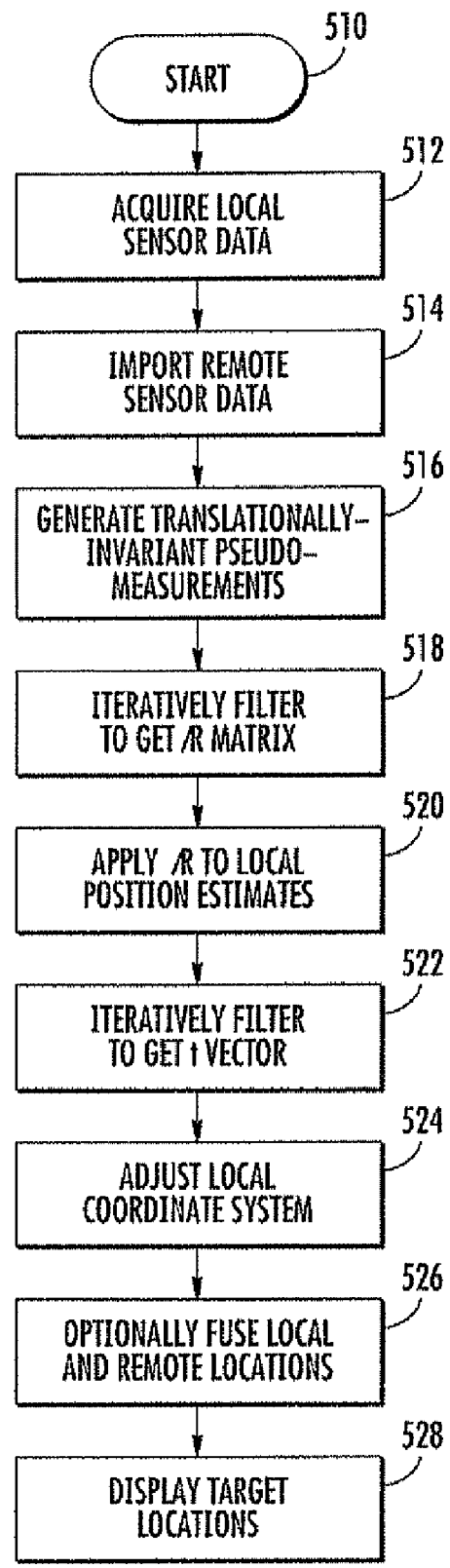
FIG. 5 is a simplified logic flow chart or diagram illustrating steps in generating the translationally invariant target data system and determination of the rotation matrix, and using the rotation matrix so determined to further determine the translation vector.

FIG. 5 is a simplified logic flow chart or diagram illustrating gridlock or coordinate registration according to an aspect of the invention. The logic of FIG. 5 begins at a START block 510, and proceeds to a block 512, representing acquisition of locally sensed target location data or information. Block 514 represents importation of remotely generated target location data or information. Block 516 represents generation of translationally-invariant pseudomeasurements. The generation of translationally-invariant pseudomeasurements is illustrated in FIG. 4A. In FIG. 4A, translationally-invariant pseudomeasurements are generated by (a) taking the location difference between or among all of the locally determined target locations and a selected one of the locally determined target locations, and (b) taking the location difference between or among all of the remotely determined target locations and a selected one of the remotely determined target locations. In FIG. 4A, this means selecting as the reference locations L1 and E1 (for example), and taking the location differences L1-L2; L1-L3; and L1-L4 and E1-E2; E1-E3; and E1-E4. These two difference measurements are each translationally invariant, in that each measurement set occurs in a single coordinate system, so any translation of the coordinate system fails to change the differences.

More generally, the creation of the local translationally invariant pseudomeasurements is represented mathematically as $$\Delta \vec{q}_{2,L} = \vec{q}_{2,L} - \vec{q}_{1,L}$$

$$\Delta \vec{q}_{3,L} = \vec{q}_{3,L} - \vec{q}_{1,L}$$

$$\Delta \vec{q}_{4,L} = \vec{q}_{4,L} - \vec{q}_{L1,L}$$

and the generation of the remote or external translationally invariant pseudomeasurements is represented mathematically as $$\Delta \vec{q}_{2,E} = \vec{q}_{2,E} - \vec{q}_{1,E}$$

$$\Delta \vec{q}_{3,E} = \vec{q}_{3,E} - \vec{q}_{1,E}$$

$$\Delta \vec{q}_{4,E} = \vec{q}_{4,E} - \vec{q}_{1,E}$$

Following the generation of the translationally-invariant pseudomeasurements in block 516 of FIG. 5, the pseudomeasurements are applied to a filter, as suggested by block 518. The filter may be a Kalman filter, to iteratively obtain the best estimate of a rotation matrix $\Re$ which rotationally aligns the local coordinate system with the remote coordinate system. The first iteration through the Kalman filter uses the pair $(\Delta \vec{q}_{2,L}, \Delta \vec{q}_{2,E})$, the second iteration uses the pair $(\Delta \vec{q}_{3,L}, \Delta \vec{q}_{3,E})$, the third iteration uses the pair $(\Delta \vec{q}_{4,L}, \Delta \vec{q}_{4,E})$, and so forth. The result of this filtration is a best estimate of the rotation matrix $\Re$ that, when applied to the locally sensed target locations, maps to the externally sensed target locations. From block 518, the logic of FIG. 5 flows to a block 520.

Block 520 of FIG. 5 represents the application of the rotation matrix $\Re$ to the local target position estimates L1, L2, L3, and L4. This in effect rotates the local coordinate system, in which the local measurements were made. The rotated local estimates of the target track positions is mathematically expressed as $$\vec{q}_{1,L4} = \Re \vec{q}_{1,L}$$

$$\vec{q}_{2,L4} = \Re \vec{q}_{2,L}$$

$$\vec{q}_{3,L4} = \Re \vec{q}_{3,L}$$

$$\vec{q}_{4,L4} = \Re \vec{q}_{4,L}$$

FIG. 4B is a simplified diagram, in which the rotational positions of the various locally measured targets are rotated by a fixed amount, illustrated as angle $\Re$. This amount of rotation generates rotated intermediate (I) positions I1, I2, I3, and I4. Intermediate positions I1, I2, I3, and I4 are not congruent with externally determined locations E1, E2, E3, and E4.

Once the translationally invariant measurements have been used to determine the rotation matrix $\Re$, the rotation matrix can in turn be used to determine the value of the translation vector $\vec{t}$. Block 522 of FIG. 5 represents the passing of rotationally adjusted local measurements through a filter, such as a Kalman filter, to iteratively obtain the best estimate for the translation vector $\vec{t}$ which adjusts the position of the local sensor or adjusts the coordinate system. The first iteration through the Kalman filter uses the pair ($\vec{q}_{1,LA}$, $\vec{q}_{1,E}$) the second iteration uses the pair ($\vec{q}_{2,LA}$, $\vec{q}_{2,E}$) the third iteration uses the pair ($\vec{q}_{3,LA}$, $\vec{q}_{3,E}$), the fourth iteration uses the pair ($\vec{q}_{4,LA}$, $\vec{q}_{4,E}$), and so forth.

The net result of the processing as so far described is to generate the rotation matrix $\Re$ and the translation vector $\vec{t}$. Once the rotation matrix $\Re$ and translation vector $\vec{t}$ are known, the coordinate system registration is readily accomplished in known fashion, as represented by block 524 of FIG. 5. In general, the registration of the local coordinate system with the external coordinate system requires rotation by $\Re$ and translation by $\vec{t}$.

It may happen that there are many external sensors, so that there are many sets of external locations. It may be assumed that the first two platforms that form into a flotilla will perform the described gridlock process, so that there is a "flotilla-wide" coordinate system that each succeeding platform can gridlock to. Thus, there should never be the need to simultaneously gridlock any platform to a plurality of different coordinate systems.

Even when the appropriate coordinate translations and rotations are performed, some disparity may still remain, attributable to unavoidable errors and to uncertainty about the correspondence between and among the various targets. That is, some targets may incorrectly have been deemed to be paired, which will result in some errors. Conventional data fusion techniques can be applied to rationalize the data, as represented by block 526 of FIG. 5.

Finally, the corrected and fused data may be applied to a utilization apparatus, which in FIG. 4 is represented by block 428, representing display of the estimated locations of the various targets. The utilization represented by block 428 may alternatively or additionally include control of various devices, such as weapons, for directing local countermeasures against the target or targets, all in known manner.

Block 512 of FIG. 5 requires that sensors have previously been operated to generate the data representing the target locations, both local and external. Calculations required by the processing represented by the various blocks of FIG. 5 are performed by preprogrammed computers, which may be located at ownship 32, in the flotilla 14, or elsewhere.

A method according to an aspect of the invention is for determining the orientation and location of a platform (32) for purposes of gridlock and or registration. The platform (32) carries at least a local sensor (32S) which tracks remote objects. The method comprises the step of generating from the local sensor (32S) first, second, third, and fourth local sensor signals representing at least first (L1), second (L2), third (L3), and fourth (L4) noncoplanar remote object positions, respectively, in a local coordinate system. The local coordinate system is inherent in the local data. The method further includes the step of acquiring first, second, third, and fourth remote external signals representing the positions of the first (E1), second (E2), third (E3), and fourth (E4) objects in an external coordinate system. The external coordinate system is inherent in the external data. Computations are performed (516) by taking the difference between the first local sensor signal (L1) and the second (L2) local sensor signal, the third (L3) local sensor signal, and the fourth (L4) local sensor signal, to thereby generate a set of first, second, and third translationally invariant local pseudomeasurements (L1-L2; l1-L3; L1-L4)). Of course, any of the local signals can be selected as being the "first." The difference is taken (516) between the first remote external signal (E1) and the second remote external signal (E2), the third remote external signal (E3), and the fourth remote external signal (E4), to thereby generate a set of first (E1-E2), second (E1-E3), and third (E1-E4) translationally invariant remote pseudomeasurements. The first, second, and third local and remote pseudomeasurements are iteratively filtered (518) to thereby generate an estimated rotation ($\Re$) which results in the best rotational agreement between the local and remote pseudomeasurements. This estimated rotation ($\Re$) is used to at least partially correct the coordinate system associated with the local sensor (32S), to thereby improve the registration between or among the first, second, third, and fourth local and remote sensor signals.

According to another mode of the method of the invention, a further step (520) is performed of applying the estimated rotation ($\Re$) to the first (L1), second (L2), third (L4), and fourth (L4) local sensor signals, to thereby generate first (I1), second (I2), third (I3), and fourth (I4) rotationally adjusted local object positions. The first (I1), second (I2), third (I3), and fourth (I4) local rotationally adjusted and first (E1), second (E2), third (E3), and fourth (E4) remote measurements are iteratively filtered in corresponding pairs (I1,E1; I2,E2; I3,E3; I4,E4) to thereby generate an estimated translation (t) which results in the best agreement or registration between the local and remote measurements or coordinate systems. In a preferred version of this mode of the method, the further step is performed of applying the estimated rotation and translation to the location and orientation of the local platform (32).

A method for determining the location of at least four separate target objects includes the step of sensing the target objects from a local location (32), to thereby generate local target signals (L1, L2, L3, and L4) identifying the locations of the target objects in a local coordinate system. The method also includes the step of sensing the target objects from a location which is remote relative to the local location, to thereby generate external target signals identifying the locations of the objects (E1, E2, E3, E4) in an external coordinate system, which locations in the external coordinate system will in general not coincide with the locations of the target objects in the local coordinate system. The difference is taken between the locations of three of the target objects in the local coordinate system and a fourth of the target objects in the local coordinate system (L1-L2; L1-L3; L1-L4) to thereby generate translationally invariant pseudomeasurements in the local coordinate system. The difference is taken between the locations of three of the target objects in the external coordinate system and a fourth of the target objects in the external coordinate system (E1-E2; E1-E3; E1-E4) to thereby generate translationally invariant pseudomeasurements in the external coordinate system. Each of the pseudomeasurements in the external coordinate system corresponds to one of the pseudomeasurements in the local coordinate system. Corresponding pairs of the local and external pseudomeasurements (L1-L2,E1-E2; L1-L3,E1-E3; L1-L4,E1-E4) are iteratively filtered (518), as by a Kalman filter, to thereby produce an estimated rotation which provides the best agreement ($\Re$) between the local and remote coordinate systems. The estimated rotation ($\Re$) is applied (520) to the locations of the targets in the local coordinate system, to thereby generate rotated target locations or positions (I1, I2, I3, I4) in the local coordinate system. Each of the rotated target positions (I1, I2, I3, I4) in the local coordinate system corresponds to one of the target positions (E1, E2, E3, E4) in the external coordinate system. Corresponding pairs of the rotated target positions and the target positions in the external coordinate system (I1,E1; I2,E2; I3,E3; I4,E4) are iteratively filtered (522) to thereby produce an estimated translation ($\vec{t}$) which provides the best agreement between the local and remote coordinate systems. The estimated rotation ($\Re$) and the estimated translation ($\vec{t}$) are applied to the locations of the target objects (L1, L2, L3, L4) in a local coordinate system, to thereby match the locations as sensed in the local coordinate system (L1, L2, L3, L4) with the locations as sensed in the external coordinate system (E1, E2, E3, E4). The local target signals, identifying the locations of the target objects in the local coordinate system to which the estimated rotation and the estimated translation have been applied, which is to say in the external coordinate system, are displayed or otherwise used as is well known in the art.

A method for determining the location of at least first, second, third, and fourth separate and noncoplanar target objects includes the step of sensing the target objects from a local location (32), to thereby generate first (L1), second (L2), third (L3), and fourth (L4) local target signals identifying the locations of the target objects in a local coordinate system. The local coordinate system is inherent in the data. The method also includes the step of sensing the target objects from a remote location (14) relative to the local location (32), to thereby generate first (E1), second (E2), third (E3), and fourth (E4) external target signals identifying the locations of the objects in an external coordinate system. The external coordinate system is inherent in the external data. The locations (L1, L2, L3, L4) of the target objects in the external coordinate system will in general not coincide with the locations of the target objects (E1, E2, E3, E4) in the local coordinate system. The method further includes the step (516) of taking the difference between the locations of the first and second (L1-L2), the first and third (L1-L3), and the first and fourth (L1-L4) target objects in the local coordinate system to thereby generate first, second, and third translationally invariant pseudomeasurements in the local coordinate system. The difference is taken (516) between the locations of the first and second (E1-E2), the first and third (E1-E3), and the first and fourth (E1-E4) target objects in the external coordinate system to thereby generate first, second, and third translationally invariant pseudomeasurements in the external coordinate system, each of which pseudomeasurements in the external coordinate system corresponds to a pseudomeasurement in the local coordinate system. The first, second, and third local and external pseudomeasurements are iteratively filtered (518) to thereby produce an estimated rotation ($\Re$), in the form of a matrix, which provides the best agreement between the local and remote coordinate systems. The estimated rotation ($\Re$) is applied (520) to the first (L1), second (L2), third (L3), and fourth (L4) local target signals in the local coordinate system, to thereby generate rotated target locations (I1, I2, I3, and I4) in the local coordinate system, which first, second, third, and fourth rotated target positions (I1, I2, I3, and I4) in the local coordinate system correspond on a one-to-one basis, but not necessarily in location, to the first (E1), second (E2), third (E3), and fourth (E4) target positions in the external coordinate system, respectively. The method includes the steps of iteratively filtering the first rotated target position (I1) in the local coordinate system with the first target position (E1) in the external coordinate system, the second rotated target position (I2) in the local coordinate system with the second target position (E2) in the external coordinate system, the third rotated target position (I3) in the local coordinate system with the third target position (E3) in the external coordinate system, and the fourth rotated target position (I4) in the local coordinate system with the fourth target position (E4) in the external coordinate system, to thereby produce an estimated translation ($\vec{t}$) which provides the best agreement between the local and remote coordinate systems. The estimated rotation ($\Re$) and the estimated translation ($\vec{t}$) are applied to the first (L1), second (L2), third (L3), and fourth (L4) locations of the target objects in the local coordinate system, to thereby match the locations as sensed in the local coordinate system with the locations as sensed in the external coordinate system. The local target signals, identifying the locations of the target objects in the local coordinate system to which the estimated rotation and the estimated translation have been applied, are displayed or otherwise used.

What is claimed is:

1. A method for determining the orientation and location of a first sensor on a platform having a location and orientation, said first sensor tracking remote objects for purposes of gridlock and registration, said method comprising the steps of:
   generating first, second, third, and fourth local sensor signals representing at least first, second, third and fourth noncoplanar remote object positions, respectively, in a local coordinate system;
   acquiring first, second, third, and fourth remote external signals representing the positions of said first, second, third, and fourth objects in an external coordinate system which is not congruent with said local coordinate system;
   taking the differences between said first local sensor signal and said second local sensor signal, said third local sensor signal, and said fourth local sensor signal, to thereby generate a set of first, second, and third translationally invariant local pseudomeasurements;
   taking the difference between said first remote external signal and said second remote external signal, said third remote external signal, and said fourth remote external signal, to thereby generate a set of first, second, and third translationally invariant remote pseudomeasurements; and
   iteratively filtering said first, second, and third local and remote pseudomeasurements to thereby generate an estimated rotation which results in the best agreement between said local and remote pseudomeasurements.

2. A method according to claim 1, further comprising the steps of:
   applying said estimated rotation to the first, second, third, and fourth local sensor signals, to thereby generate first, second, third, and fourth rotationally adjusted local object positions;
   iteratively filtering said first, second, and third local rotationally adjusted and remote measurements to thereby generate an estimated translation which results in the best agreement between said local and remote measurements.

3. A method according to claim 2, further comprising the step of applying said estimated rotation and translation to said location and orientation of said platform.

4. A method for determining the location of at least four separate target objects, said method including the steps of:
   sensing said target objects from a local location, to thereby generate local target signals identifying the locations of said target objects in a local coordinate system;
   sensing said target objects from a remote location relative to said local location, to thereby generate external target signals identifying the locations of said objects in an external coordinate system, which locations in said external coordinate system will in general not coincide with the locations of said target objects in said local coordinate system;

taking the difference between the locations of three of said target objects in said local coordinate system and a fourth of said target objects in said local coordinate system to thereby generate translationally invariant pseudomeasurements in said local coordinate system;

taking the difference between the locations of three of said target objects in said external coordinate system and a fourth of said target objects in said external coordinate system to thereby generate translationally invariant pseudomeasurements in said external coordinate system, each of which pseudomeasurements in said external coordinate system corresponds to a pseudomeasurement in said local coordinate system;

iteratively filtering corresponding pairs of said local and external pseudomeasurements to thereby produce an estimated rotation which provides the best agreement between said local and remote coordinate systems;

applying said estimated rotation to said locations of said targets in said local coordinate system, to thereby generate rotated target locations in said local coordinate system, each of which rotated target positions in said local coordinate system corresponds to one of said target positions in said external coordinate system;

iteratively filtering corresponding pairs of said rotated target positions and said target positions in said external coordinate system to thereby produce an estimated translation which provides the best agreement between said local and remote coordinate systems;

applying said estimated rotation and said estimated translation to said locations of said target objects in a local coordinate system, to thereby match the locations as sensed in said local coordinate system with the locations as sensed in said external coordinate system; and displaying said local target signals identifying the locations of said target objects in said local coordinate system to which said estimated rotation and said estimated translation have been applied.

5. A method for determining the location of at least first, second, third, and fourth separate target objects, said method including the steps of:

sensing said target objects from a local location, to thereby generate first, second, third, and fourth local target signals identifying the locations of said target objects in a local coordinate system;

sensing said target objects from a remote location relative to said local location, to thereby generate first, second, third, and fourth external target signals identifying the locations of said objects in an external coordinate system, which locations in said external coordinate system will in general not coincide with the locations of said target objects in said local coordinate system;

taking the difference between the locations of said first and second, said first and third, and said first and fourth target objects in said local coordinate system to thereby generate first, second, and third translationally invariant pseudomeasurements in said local coordinate system;

taking the difference between the locations of said first and second, said first and third, and said first and fourth target objects in said external coordinate system to thereby generate first, second, and third translationally invariant pseudomeasurements in said external coordinate system, each of which pseudomeasurements in said external coordinate system corresponds to a pseudomeasurement in said local coordinate system;

iteratively filtering said first, second, and third local and external pseudomeasurements to thereby produce an estimated rotation matrix which provides the best agreement between said local and remote coordinate systems;

applying said estimated rotation matrix to said first, second, third, and fourth local target signals in said local coordinate system, to thereby generate rotated target locations in said local coordinate system, which first, second, third, and fourth rotated target positions in said local coordinate system correspond to said first, second, third, and fourth target positions in said external coordinate system, respectively;

iteratively filtering said first rotated target position in said local coordinate system with said first target position in said external coordinate system, said second rotated target position in said local coordinate system with said second target position in said external coordinate system, said third rotated target position in said local coordinate system with said third target position in said external coordinate system, and said fourth rotated target position in said local coordinate system with said fourth target position in said external coordinate system, to thereby produce an estimated translation which provides the best agreement between said local and remote coordinate systems;

applying said estimated rotation matrix and said estimated translation to said first, second, third and fourth locations of said target objects in said local coordinate system, to thereby match the locations as sensed in said local coordinate system with the locations as sensed in said external coordinate system; and displaying said local target signals identifying the locations of said target objects in said local coordinate system to which said estimated rotation matrix and said estimated translation have been applied.

* * * * *